US006941888B2

(12) United States Patent
Barsoum

(10) Patent No.: US 6,941,888 B2
(45) Date of Patent: Sep. 13, 2005

(54) HYBRID SHIP HULL

(76) Inventor: Roshdy George S. Barsoum, 7200 Heather Hill La., McLean, VA (US) 22101

( * ) Notice: Subject to any disclaimer, the term of this patent is extended or adjusted under 35 U.S.C. 154(b) by 0 days.

(21) Appl. No.: 10/735,747

(22) Filed: Dec. 16, 2003

(65) Prior Publication Data

US 2005/0145159 A1 Jul. 7, 2005

(51) Int. Cl.[7] .................................................. B63B 3/00
(52) U.S. Cl. ..................................... 114/356; 114/65 R
(58) Field of Search ............................ 114/65 R, 74 A, 114/61.2

(56) References Cited

U.S. PATENT DOCUMENTS 5,263,428 A * 11/1993 Mo .......................... 114/65 A
5,570,650 A * 11/1996 Harley ...................... 114/61.2
5,582,124 A * 12/1996 Sikora et al. ............. 114/74 A
6,505,571 B1 * 1/2003 Critchfield et al. ....... 114/65 R

* cited by examiner

*Primary Examiner*—Jesus D. Sotelo

(57) ABSTRACT

A marine vessel which includes a bow section, a stern section and a mid-section, wherein the bow and stern sections are of different hull construction from that of the mid-section which has a curved outer shape; the skin of the hull of the bow and stern sections are preferably made of hybrid composites while the port and starboard sides of the mid-section are of hybrid composites supported on the inside thereof by a light framing to transmit pressure loads; the mid-section further includes an inner section that may be of box beam construction or longitudinal bulkhead construction.

19 Claims, 6 Drawing Sheets

HYBRID SHIP HULL

The U.S. Government has a non-exclusive, royalty-free license to practice the subject invention for government use.

FIELD OF THE INVENTION

The present invention relates to a hybrid ship hull with a curved mid-body section having a low blocking factor, in which different parts of the hull are made of different materials. More particularly, the present invention relates to a hybrid ship hull whose outer hull on the starboard and port sides of the mid-section are made of hybrid composites such as glass-reinforced plastic composites (GRP) or of panels with a light framing and connected to an inner longitudinal bulkhead made of straight steel box framing construction, or of a straight steel construction similar to conventional or modified double-hull construction, whereby the stern and bow sections can also be made of composite GRP. All framing is preferably made of stainless steel for low magnetic signature.

The present invention also relates to high-speed ships with multi-hull vessels such as catamaran and trimaran with hybrid constructions whose hulls are made of hybrid constructions and whose cross structures are of steel construction.

BACKGROUND OF THE INVENTION

A brief technical discussion is believed desirable to place the significance of this invention into proper perspective.

Current ship hulls are made of steel which is magnetic. Additionally, the present shipyard design uses the conventional single-hull construction with longitudinal stringers and transverse framing. To achieve a non-magnetic capability, stainless steel hulls are recently being investigated for the next generation of Navy ships. Furthermore, to achieve lower costs in connection with the use of stainless steel, a new advanced double-hull concept is being addressed. The double-hull concept also results in increased ship survivability. However, residual welding stresses lead to large plate (dishing) deformations during the fabrication process of steel hulls. These deformations which are called "hungry horse," increase the hull's detection. Stainless steel hulls are expected to result in much higher residual stresses and, hence, in much higher "hungry horse" deformations. The only means to assure tight manufacturing tolerances is to relieve the residual stresses by heat treatment which is very expensive, or to use some advanced welding technology such as laser welding, that could minimize the residual stresses. However, such advanced welding technologies are normally not available at shipyards. The best alternative is to build the hull out of composites which permits the achievement of very tight dimensional tolerances. However, several studies have shown that for hulls longer than 200 feet, even carbon fiber composites would not provide the required stiffness and compressive strength that are required for the hull. Additionally, the cost of carbon fiber composites is prohibitive for this size of ships with the current cost of $12 to $18/lb. for carbon fiber compared to $0.45/lb. for high strength steel and $3/lb. for stainless steel. Known low-cost/high-performance composite materials, such as glass fiber composites (GRP) using resin transfer molding processing, that are now being used in patrol boats, corvettes and mine hunters, do not have the stiffness nor the in-plane strength required for long hulls of combatant ships or other large commercial ships. The load-carrying mechanism for long Navy combatants is by axial tension and compression in the hogging and sagging mode between waves. The in-plane strength of the composites therefore becomes the critical design factor. For small ships or boats, the bending strength of the composites is critical. The technology of known composite sandwich construction, common in connection with smaller ship lengths or boats, would not add to the carrying capability for sea loads in long ship hulls. GRP composites, however, are the best choice to achieve all of the magnetic, radar cross section and hydrodynamic signature requirements as well as low maintenance costs.

Composite hulls for Naval vessels of lengths less than 300 feet are presently being built using GRP or carbon fiber sandwich constructions that may use a patented process called "SCRIMP," U.S. Pat. No. 4,902,215 and U.S. Pat. No. 5,958,325 or other room-temperature curing processes. In such prior art constructions, the entire hull is made of the same material which is very different from a hybrid construction where more than one material is used. In addition, this type of construction would not be able to sustain the sea loads for curved mid-body hulls for large ships of a length greater than 300 feet.

A composite-type hull construction that combines composites and steel is disclosed in the U.S. Pat. No. 4,365,580 to Blount and by others remotely related to Blount's patent. These other patents which are referenced in Blount are sandwich-type constructions wherein a synthetic foam material is sandwiched between inner and outer shells and hence are not hybrids of two different materials.

In the U.S. Blount Pat. No. 4,365,580, a steel hull construction is used consisting of an inner box-like structure with a fiberglass outer hull. The steel box is carrying all the sea loads (bending moments and shear), while the composite shell and foam transmits the water pressure to the box. Thus, the hull of this patent resembles a steel hull covered with an add-on parasitic composite skin that gives it the shape. This patent as well as the patents cited therein thus represent sandwich-type constructions in which a synthetic foam material is sandwiched between inner and outer shells and therefore are not hybrids of two different materials.

The U.S. Pat. No. 5,778,813 to Kennedy addresses a composite laminated panel for containment vessels such as double-hull oil tankers. It is composite in the sense that it is a steel double-hull with an elastomer core inbetween. However, this patent is not concerned with the problems addressed by the present invention because the steel carries all sea loads and the elastomer merely acts in shielding the inner hull from cracks when the outer hull is pierced, ruptured or penetrated. The U.S. Pat. No. 6,505,571 to Critchfield et al. describes some types of connections between composite and steel hybrid constructions which can be used in conjunction with hull constructions as disclosed in my prior patent. The main focus of the Critchfield patent is the connection between two different sections; namely, a fiber-plastic and a metallic hull section, whereas the instant invention relates to hulls with a curved mid-body section made of composites with light framing on the inside thereof for the mid-body section that transmit the sea loads to the longitudinal framing or the bulkheads.

My prior U.S. Pat. No. 6,386,131 incorporates the aforementioned key performance characteristics and requirements. However, the hull of my prior patent is applicable only for straight body hull shapes with a block coefficient ~1. According to the instant invention, the hull, contrary to my aforementioned prior U.S. patent, uses a composite with a light framing on the inside of the composite for the mid-body section which transmits the sea loads to a longitudinal framing or bulkheads, which together with the deck and bottom carry the major loading whereby the light framing on the inside of the composite transmits the sea loads to the longitudinal framing or bulkheads. The instant invention is for Naval combatants that require a curved mid-body section with a block coefficient ~0.5, such as in a destroyer artistically represented in FIG. 1 of this application. The curved mid-body results in increased fuel efficiency and speed, in addition to other hydrodynamic advantages. The wider mid-body would also result in increased resistance to sea loading and whipping moments. According to this invention, the curved mid-body is made of a hybrid composite and light framing on the inside thereof for transmitting the water pressure loading to an inner straight framing or an inner straight longitudinal bulkhead. The global hull-girder-loads are therefore resisted in this invention by the inner longitudinal-framing or longitudinal bulkheads.

SUMMARY OF THE INVENTION

The main difference of this invention compared to the hull construction of my aforementioned prior U.S. Pat. No. 6,386,131 resides in the following: while the stern and bow sections are preferably made again of hybrid composites, the mid-section on both starboard and port sides are made of hybrid composites with light framing on the inside thereof and with an inner mid-section which according to one embodiment consists of a longitudinal framing or according to another embodiment consists of longitudinal bulkheads. The inner mid-section of the framing of the first-mentioned embodiment of this invention is made of a steel frame which, together with the deck and keel, carry all the sea loads. According to the second aforementioned embodiment, the inner longitudinal bulkheads use either a conventional or a modified double-hull construction as disclosed, for example, in U.S. Pat. No. 5,582,124 to Sikora et al. According to this invention, the starboard and port sides of the hull mid-section are constructed with hybrid light metallic framing and continuous composite shells or panels to carry the water pressure loads and transmit the resulting loads through the light deck framing to the inner section. The present invention provides a highly efficient use of materials in carrying the sea loads and providing several key naval requirements. In the instant invention, each material carries the loads which its mechanical properties allows it to carry most efficiently, i.e., the steel carrying the axial loads and providing the high stiffness while the composites carry distributed the pressure loads and providing the low weight and perfect hydrodynamic shape.

Accordingly, it is a primary object of this invention to provide a more efficient, cost-effective and lighter weight hull structure, especially for hulls with a length of about 300 feet or larger.

A further object of the present invention resides in a hull construction that accommodates requirements for advanced bow and stern geometries.

Still another object of the present invention resides in a hull construction which permits the realization of advanced hull designs such as the "tumblehome" hull for reduced signature envisioned by the Navy that may use water jet propulsion systems, modified water jets, shrouded propellers or other complex geometries. The complex stern sections associated with these propulsor systems may be long sections requiring double curvature and appendages that are expensive to form with steel plating or forging, not to mention that the steel construction would make these sections extremely heavy.

Another object of the present invention resides in an affordable ship hull that meets future signature requirements and provides a survivability of an order of magnitude higher than the current designs.

BRIEF DESCRIPTION OF THE DRAWINGS

These and other objects, features and advantages of the present invention will become more apparent from the following description when taken in conjunction with the accompanying drawings which show, for purposes of illustration only, several embodiments in accordance with the present invention, and wherein.

DETAILED DESCRIPTION OF THE DRAWINGS

Figure 1:
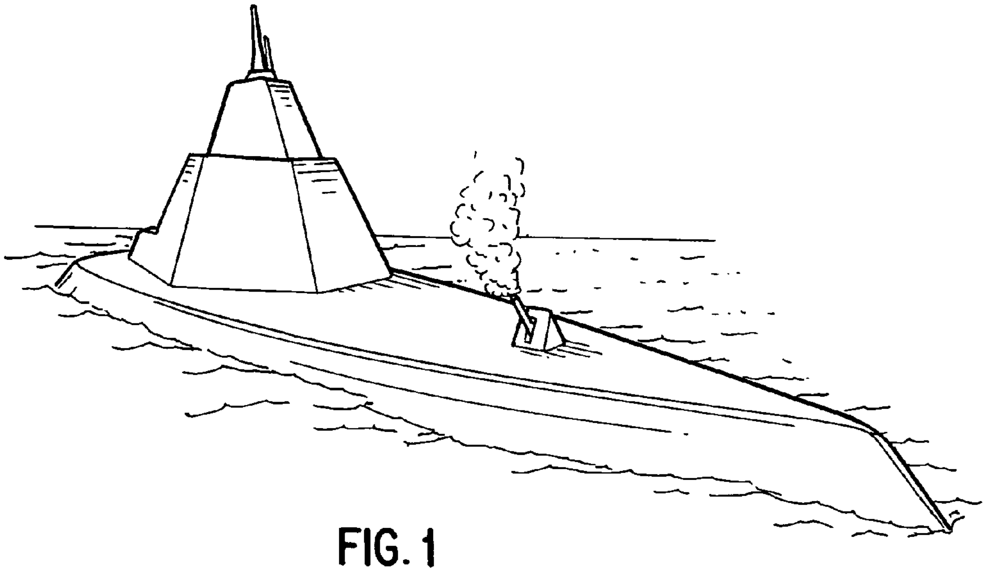
FIG. 1 is an artistic perspective rendition of a Navy combatant with a fine bow providing a low block coefficient of ~0.5 and with a curved mid-body section according to this invention.

Referring now to the drawing wherein like reference numerals are used throughout the various views to designate like parts, and more particularly to FIG. 1, this figure represents an artistic rendition of a combatant Naval ship embodying a hull construction according to the present invention. The schematically illustrated Navy combatant of FIG. 1 includes a fine bow with a low block coefficient of ~0.5 as well as a curved mid-body section according to this invention.

Figure 1A:
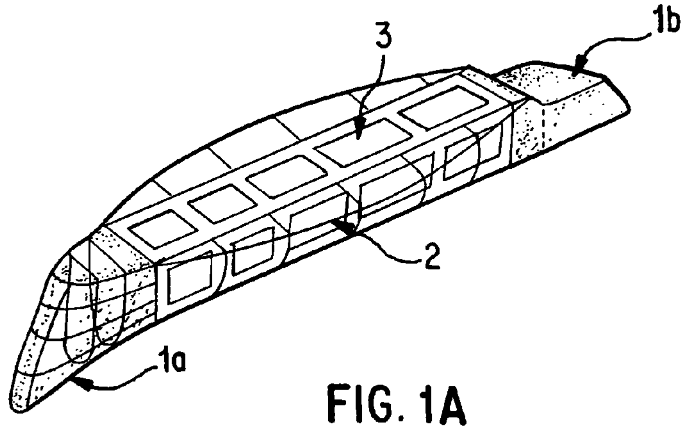
FIG. 1A is a schematic perspective view of a first embodiment of a hull construction according to this invention.

In the first embodiment of a hybrid hull according to this invention, illustrated in FIG. 1A, the bow and stern sections generally designated by reference numerals 1*a* and 1*b* have complex doubly curved surfaces and are made of fiberglass composites with embedded steel framing. The mid-section generally designated by reference numeral 3 includes curved port and starboard hybrid shells 2 to provide a construction of a hull with a curved mid-section whose inner mid-section 3 is preferably of stainless steel box beam construction (FIG. 2).

Figure 1B:
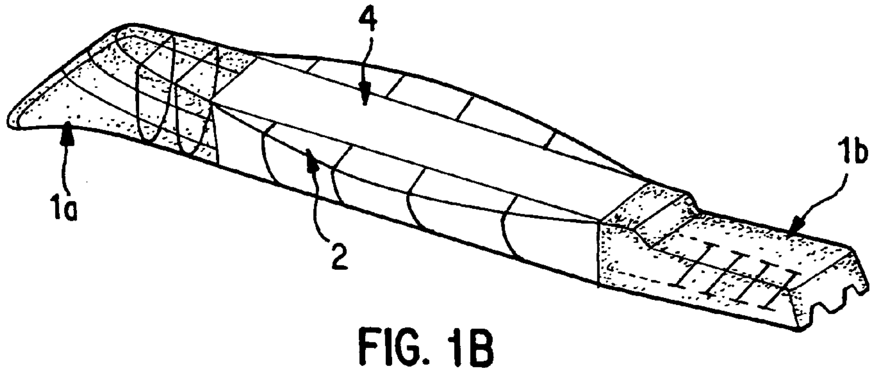
FIG. 1B is a schematic perspective view of a second embodiment of a hull construction according to this invention.

In the second embodiment of a hybrid hull of this invention illustrated in FIG. 1B, the bow and stern sections 1*a* and 1*b* again have complex doubly curved surfaces made of fiberglass composites with embedded steel framing. The port and starboard sides of the mid-section 3 include curved hybrid shells 2 while the inner mid-section 4 includes longitudinal bulkheads preferably constructed of stainless steel in a manner similar to conventional or modified double-hull construction.

Figure 2:
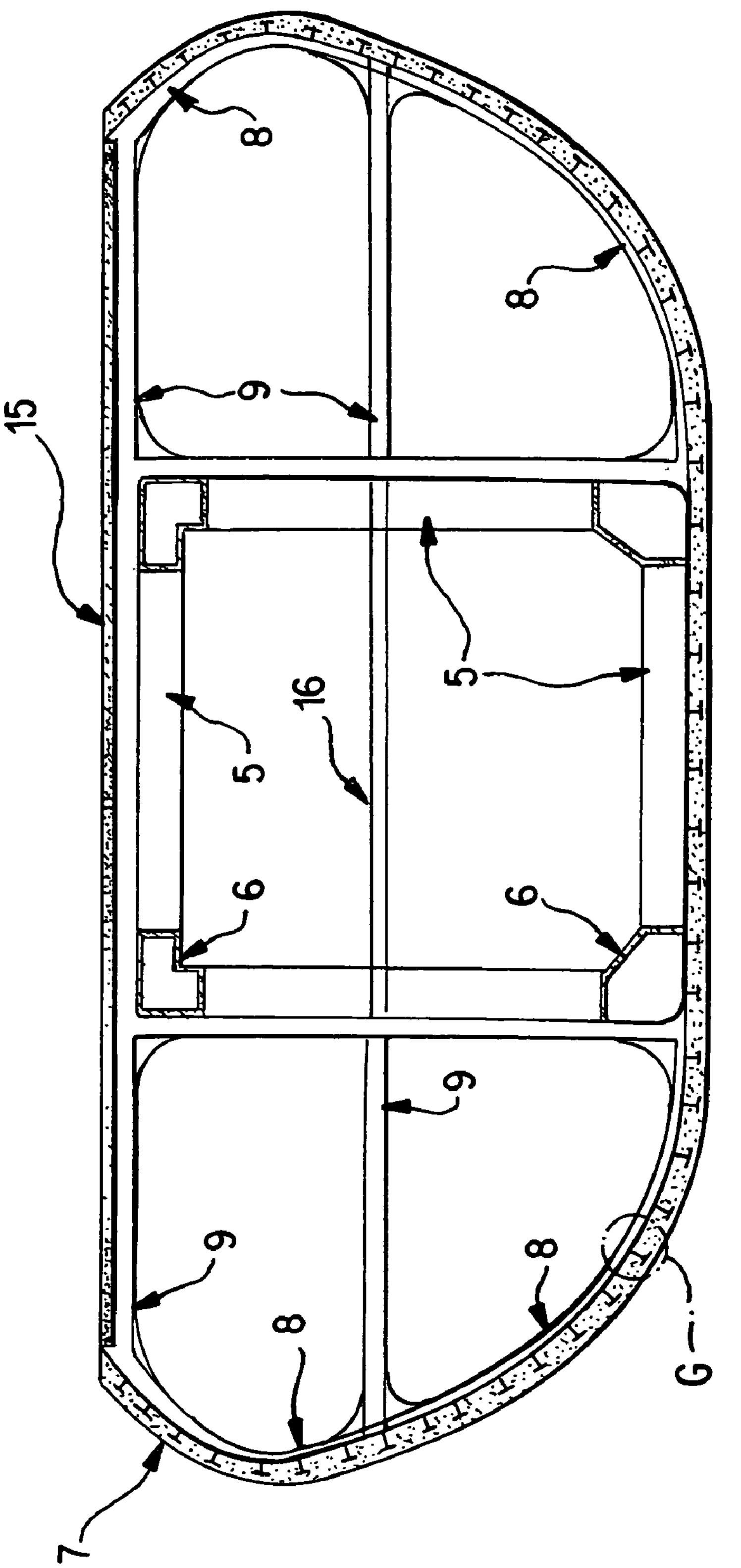
FIG. 2 is a somewhat schematic transverse cross-sectional view through the mid-section of the hybrid hull construction of FIG. 1A.

FIG. 2 illustrates a typical transverse cross section through the hybrid hull construction of FIG. 1A in which the stainless steel vertical and cross-framing 5 carries the hull-girder loads while the stainless steel longitudinal framing 6 also carries the main hull-girder loads. Reference numeral 7 generally designates composite outer shells made of known E- or S-2 glass fiber composites whereby a light framing 8 of stainless steel on the inside of these outer shells 7 transmits the pressure loads. Metallic sandwich constructions 9, which use a core of metal foams, stainless steel microtrusses, folded plates such as NAVTRUSS® or honeycomb, are used for the upper and intermediate decks 15 and 16 to provide protection against shocks. The decks 15 and 16 may also be made of composite materials similar to the outer skin composites. An elastomeric material 10, for example, Crestomer® or Versalink®, is backing the composites at the framing. The upper and intermediate decks 15 and 16 are thereby preferably made of composites.

Figure 3:
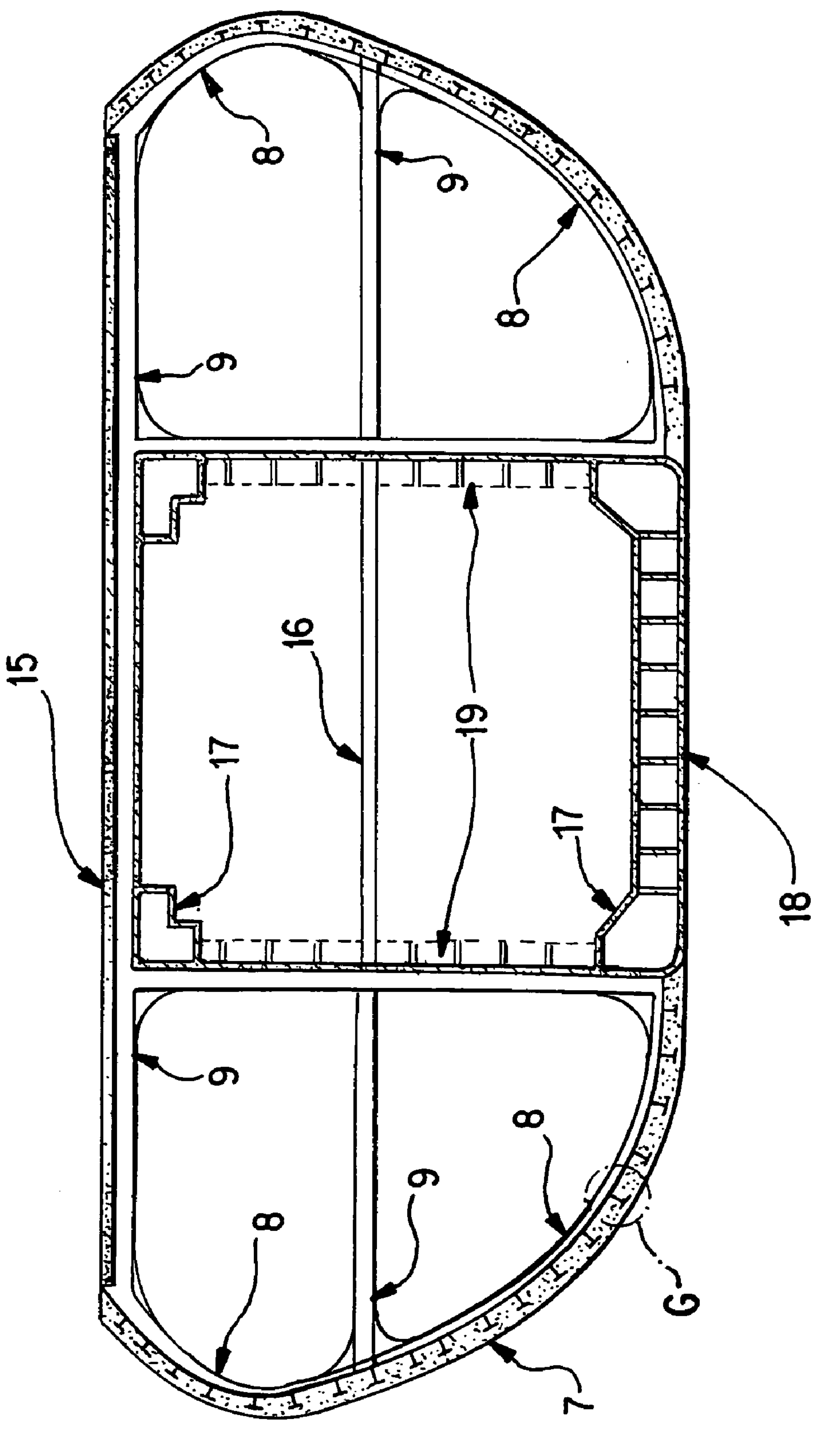
FIG. 3 is a somewhat schematic transverse cross-sectional view through the mid-body section of the hull construction of FIG. 1B.

FIG. 3 is a somewhat schematic transverse cross-sectional view through the hull mid-section of the embodiment of FIG. 1B which again includes outer shells 7 made of composite materials such as known E- or S-2 glass fiber composites that are supported on the inside by a stainless steel light framing 8 for transmitting pressure loads. The upper and intermediate decks 15 and 16 are again of metallic sandwich construction 9 which use a core of metal foams, stainless steel microtrusses, folded plates, such as NAVTRUSS® or honeycomb, to provide protection against shocks. However, the decks may also be made of composite material similar to the outer skin composites. Reference numeral 10 again designates an elastomeric material, such as Crestomer® or Versalink® that backs the composite at the framing. The upper deck 15 is thereby preferably made of a composite material which is also the case of the intermediate deck 16. The longitudinal girders 17 are of known modified double-hull construction and the bottom 18 is also of modified double-hull construction while the sides 19 of the longitudinal bulkheads involve single-side plating with longitudinal stiffeners.

Figure 4:
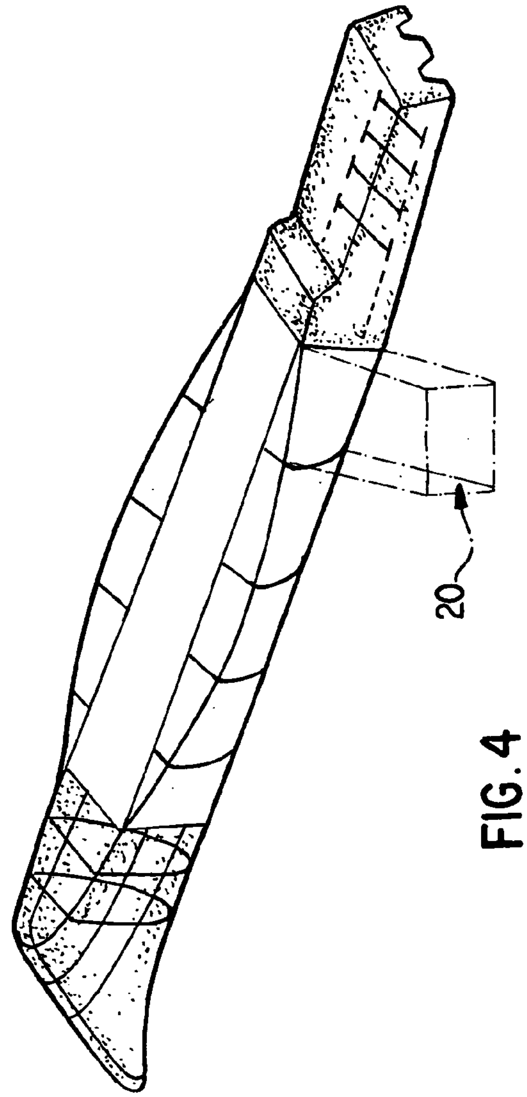
FIG. 4 is a schematic perspective view of a modified hull construction according to this invention utilizing individual composite panels in lieu of continuous composite panels for the mid-section.

FIG. 4 illustrates somewhat schematically a hybrid hull of this invention that offers the possibility of using individual composite panels 20 instead of the continuous composite sides of the prior embodiments. The panels are thereby fastened by arrangements 22, 23 and 24 illustrated in FIGS. 5A, 5B and 5C.

Figure 4A:
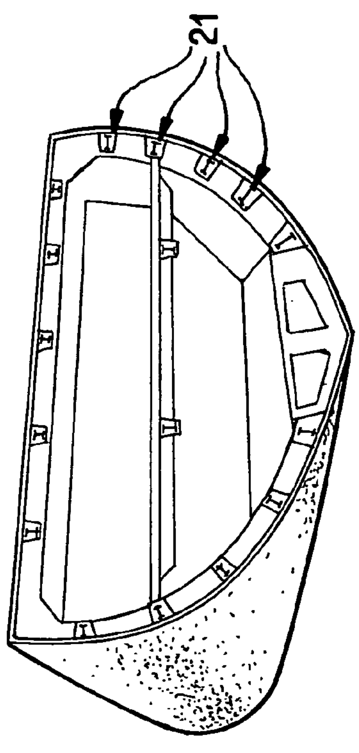
FIG. 4A is a somewhat schematic perspective view of a bow and stern construction utilizing composites embedded with stainless steel beams according to this invention.

FIG. 4A illustrates a bow or stern construction in which the stainless steel beams 21 are embedded in the composites. The stainless steel beams 21 could be welded either to the inner mid-section stainless steel box beams or to the longitudinal bulkheads. The steel beams may also be provided with holes while a special through-the-thickness stitching as known in the art can then be used to increase the bonding between the steel and the composites.

Figure 5A:
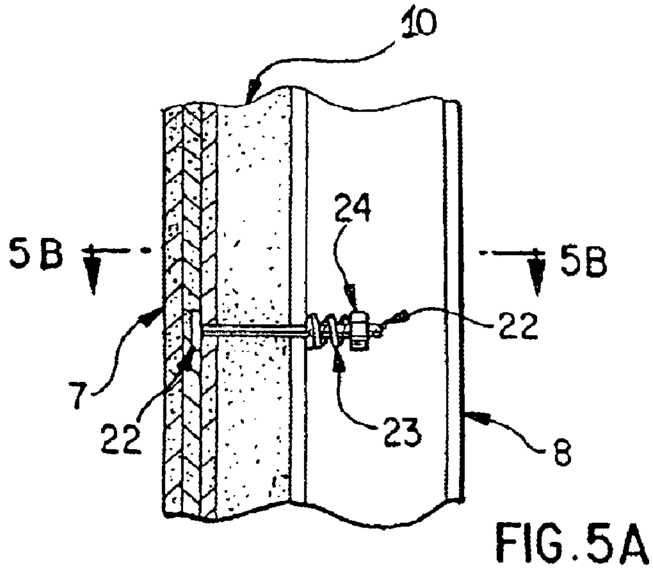
FIG. 5A is a somewhat schematic cross-sectional view, on an enlarged scale, in the area of circle G of FIGS. 2 and 3.
Figure 5B:
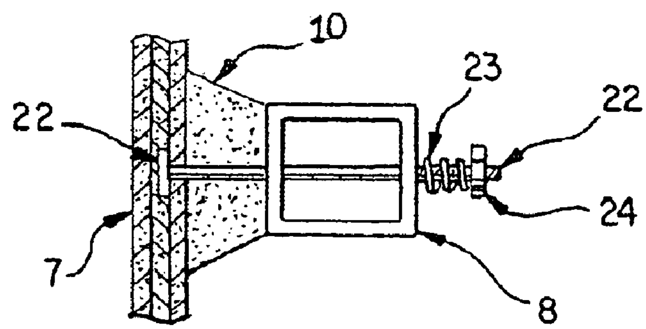
FIG. 5B is a somewhat schematic cross-sectional view, taken along line E—E of FIG. 5A.
Figure 5C:
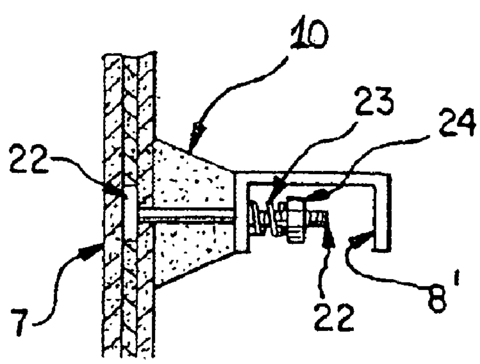
FIG. 5C is a somewhat schematic cross-sectional view, similar to FIG. 5B of a modified embodiment in accordance with the present invention.

FIG. 5A is an enlarged cross-sectional view in the area of circle G of either FIG. 2 or FIG. 3 and includes a stainless steel stiffener 8 which may be in the form of a box (FIG. 5B) or channel member (FIG. 5C). The elastomer 10 connects the stainless steel stiffener 8 with the outer shell 7 with the use of a fastener assembly that includes a stainless steel bolt 22 embedded in the composite which cooperates with a high-strength spring 23 that is prestressed with the use of nut 24.

FIG. 5B is a cross-sectional view of the assembly taken along line F—F of FIG. 5A while FIG. 5C illustrates a modified embodiment, similar to FIG. 5B, with an open box section 8'.

Figure 6A:
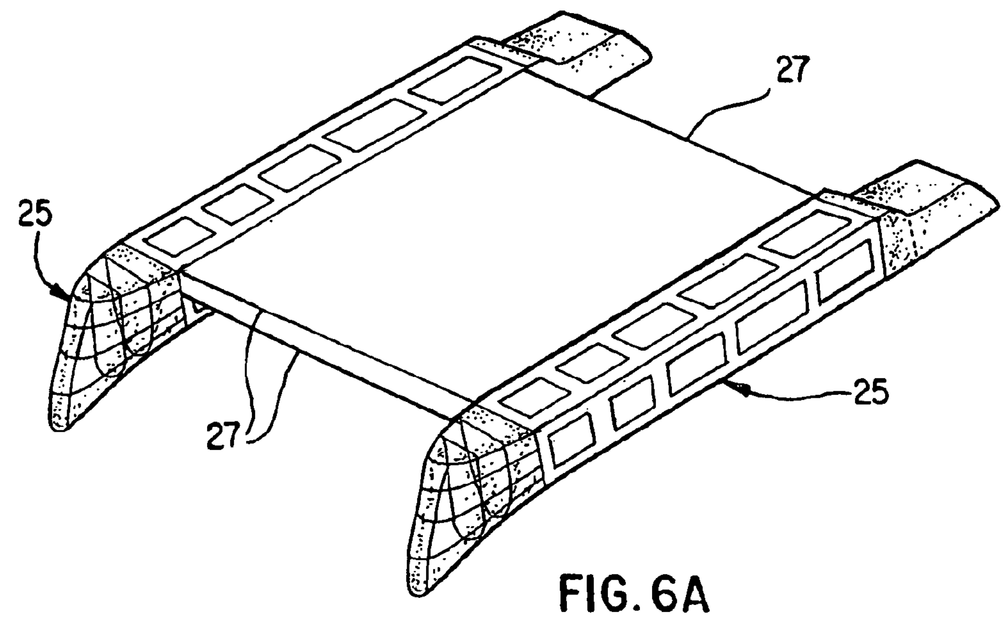
FIG. 6A is a somewhat schematic perspective view of a first embodiment of a hybrid catamaran construction according to this invention.
Figure 6B:
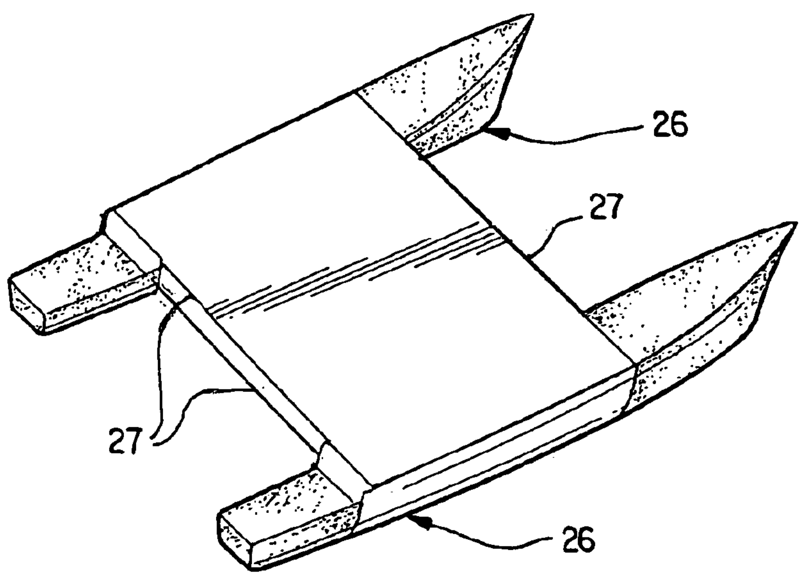
FIG. 6B is a somewhat schematic perspective view of a second embodiment of a hybrid catamaran according to this invention.

FIG. 6A illustrates a hybrid catamaran utilizing pontoons generally designated by reference numeral 25 as disclosed in FIG. 1A of my prior U.S. Pat. No. 6,386,131. The connecting cross structure generally designated by reference numeral 27 is made of stiffened steel plating as used in conventional ship design. In the embodiment of FIG. 6B, the pontoons 26 are again made of hybrid hull construction as disclosed in FIG. 1B of my prior U.S. Pat. No. 6,386,131. The connecting cross structure 27 is again made of steel plating 24 as used in conventional ship design. Furthermore, the pontoon 25 or 26 may also be made as disclosed in FIG. 1A or 1B of the instant application.

A significant advantage of the construction in FIG. 1 according to this invention is the fact that the vital functions and the crews are placed in the central part of the hull where they would be protected from any external weapons effects and could survive any blast that could result in breach of the ship's outer hull. In addition, the outer composites could be constructed as blow-out panels to relieve internal pressures generated by internal explosions. The novel construction according to this invention also provides large weapons payload and other logistics placed in the outer hull sides. A further unique feature of the hybrid construction of this invention is the use of metallic sandwich construction for the upper and intermediate decks with the use of a core of one of metal foams, stainless steel, microtrusses, folded plates such as NAVTRUSS® or honeycomb, to provide protection against shock. Another advantage realized by this invention is the ready adaptability to the revolutionary "wave piercing" bow of advanced hull forms, for example, the "tumblehome" hull which is to have complex curvatures for signature control, sea keeping or maneuvering, not possible in previous ship constructions because forming steel for long bow sections with double curvature would be extraordinarily expensive and extremely heavy. The resulting heavy mass concentration of a steel stern and bow would create problems in maneuvering and sea keeping. Current steel constructions of ships would result in that case in a very heavy bow and stern section which leads to large whipping moments in underwater explosions.

A further advantage of this invention resides in the recognition that stainless steel advanced double-hull constructions, though they have lower magnetic signature, could not be built economically for a ship with a low block coefficient, i.e., a fine bow with curved mid-section. The hybrid hull of this invention with composite bow and stern allows the manufacture of any shape necessary for meeting signature requirements at a much lower cost. Furthermore, the light-weight stern and bow lead to superior sea keeping, maneuvering, fuel efficiency and speed, in addition to reducing the whipping moments in underwater explosions. The use of a composite skin and of stainless steel inner framing for the mid-section offers lighter weight and lower cost than a stainless steel advanced double-hull construction.

A further major advantage of the composite hull of this invention is the ability to have high dimensional control which reduces its signature and allows designers to incorporate other stealth features. The "hungry horse" effect, seen on all welded steel naval ships, increases their radar cross section. It is extremely expensive to reduce these welding distortions, but with composites as used in the present invention, high dimensional control can be easily and economically achieved. In addition, composites are non-magnetic, allow designers to embed absorbing or reflection materials, tailor their electromagnetic and dielectric characteristics, and embed sensors. Composites further offer a high damping and can be tailored to reduce the acoustic signature. Composites finally also require low maintenance and have no corrosion or galvanic problems.

In addition to providing strong foundation for machinery, the stainless steel box frame construction according to FIG. 1B and its connection between the outer composite shell of the hull section allows for multi-paths of machine sound and vibrations, and thus is an excellent means for engineering absorption mechanisms. The steel box sections could provide an excellent means to absorb noise and vibration damping by filling them with polystyrene beads or foam. The novel concept would lead to a dramatic reduction of machinery noise, vibrations and structural acoustic radiation from the hull.

All steel used in the hull of my invention is preferably stainless steel type 316 when not in contact with the water or AL6XN, when in contact with the water. The composites which are preferably used with my invention are E-glass Vinyl Ester (or Epoxy) using the SCRIMP process or other resin-transfer room-temperature process. S2-Glass could also be used in selected areas for added blast and ballistic protection in the port and starboard composite sections.

While I have shown and described several embodiments in accordance with the present invention, it is understood that the same is not limited thereto, but is susceptible of numerous changes and modifications as known to those skilled in the art, and I do not wish to be limited to the details shown and described herein but intend to cover all such changes and modifications as are encompassed by the scope of the appended claims.

What is claimed is:

1. A ship hull construction with a low-block coefficient for a marine vessel, comprising a bow section, a mid-section with a substantially tumblehome shape and a stern section, in which the cross-section has a curved outer shape in the longitudinal direction so that, as viewed in transverse cross section, the mid-section becomes smaller toward the bow and stern sections, and includes an inner section with one of framing means and longitudinal bulkhead means, said hull construction having outer shells made of composite materials.

2. A marine vessel according to claim 1, wherein the inner mid-section includes a steel frame which, together with deck means and keel means, carries the hull girder loads.

3. A marine vessel according to claim 1, in which the mid-section includes inner longitudinal bulkhead means which are of one of conventional or modified double-hull construction.

4. A marine vessel according to claim 1, wherein the starboard and port sides of the mid-section are made of one of continuous composite shells or panels with a hybrid light frame means at the inside thereof to carry water pressure loads and transmit resulting loads through deck means to the inner section.

5. A marine vessel according to claim 1, wherein the mid-section includes outer shells made of glass-reinforced plastic composite materials.

6. A marine vessel according to claim 5, wherein said composite materials are one of E- or S-2 glass fiber composites.

7. A marine vessel according to claim 5, wherein the outer shells are supported on the inside thereof by a stainless steel light framing stiffener means for transmitting pressure loads.

8. A marine vessel comprising a bow section, a mid-section and a stern section, in which the mid-section has a curved outer shape and includes an inner section with one of framing means and longitudinal bulkhead means, said hull construction having outer shells supported on the inside thereof by a stainless steel light framing stiffener means for transmitting pressure loads, and the stiffener means being connected with a respective outer shell of the mid-section by way of an elastomer and a fastening assembly that includes a stainless steel bolt embedded in the composite material of the respective outer shell that cooperates with a high strength spring prestressed by a nut.

9. A marine vessel according to claim 7, wherein said stiffener means is one of open box member or channel member.

10. A marine vessel according to claim 1, further comprising stainless steel beams embedded in the composite materials that are connected to an inner section of the mid-section that includes one of stainless steel box beams, framing means or bulkhead means.

11. A marine vessel, comprising a hull having a low block coefficient and including a bow section, a mid-section and a stern section, in which the starboard and port sides of the mid-section have outer shells of hybrid composites with light framing on the inside thereof, and in which the mid-section has a curved outer shape in the longitudinal direction so that, as viewed in transverse cross section, the cross-section becomes smaller toward the bow and stern sections, and includes an inner section with one of framing means and longitudinal bulkhead means.

12. A marine vessel according to claim 11, wherein the inner mid-section includes a steel frame which, together with deck means and keel means, carries the sea loads.

13. A marine vessel according to claim 11, in which the mid-section includes inner longitudinal bulkhead means which are of one of conventional or modified double-hull construction.

14. A marine vessel according to claim 1, wherein said composite materials are one of E- or S-2 glass fiber composites.

15. A marine vessel according to claim 14, wherein the outer shells are supported on the inside thereof by a stainless steel light framing stiffener means for transmitting pressure loads.

16. A marine vessel according to claim 15, wherein the stiffener means is connected with a respective outer shell of the mid-section by way of an elastomer and a fastening assembly that includes a stainless steel bolt embedded in the composite material of the respective outer shell that cooperates with a high strength spring prestressed by a nut.

17. A marine vessel according to claim 16, further comprising stainless steel beams embedded in the composite materials that are connected to an inner section of the mid-section that includes one of stainless steel box beams, framing means or bulkhead means.

18. A marine vessel comprising a bow section, a mid-section and a stern section, in which the mid-section has a curved outer shape and includes an inner section with one of framing means and longitudinal bulkhead means, the mid-section including an inner section having upper and intermediate decks of metallic sandwich construction with a core of metal foams, stainless steel microtrusses, folded plates or honeycomb.

19. A marine vessel according to claim 14, wherein the mid-section includes an inner section having upper and intermediate decks made of composite materials similar to the composite materials used for the hull outer skin.

* * * * *